(12) United States Patent
Broughton (10) Patent No.: US 9,765,542 B1
(45) Date of Patent: Sep. 19, 2017

(54) NESTABLE, STACKABLE PORTABLE TOILET AND METHOD OF ASSEMBLING SAME

(71) Applicant: Timothy A. Broughton, St. Louis, MO (US)

(72) Inventor: Timothy A. Broughton, St. Louis, MO (US)

(*) Notice: Subject to any disclaimer, the term of this patent is extended or adjusted under 35 U.S.C. 154(b) by 272 days.

(21) Appl. No.: 14/623,283

(22) Filed: Feb. 16, 2015

Related U.S. Application Data (60) Provisional application No. 61/940,678, filed on Feb. 17, 2014.

(51) Int. Cl.
  *A47K 11/04* (2006.01)
  *E04H 1/12* (2006.01)
  *A47K 11/02* (2006.01)

(52) U.S. Cl.
  CPC ............ *E04H 1/1216* (2013.01); *A47K 11/02* (2013.01)

(58) Field of Classification Search
  CPC ........ A47K 11/00; A47K 11/02; E04H 1/1216
  USPC .................................................... 4/476–478
  See application file for complete search history.

(56) References Cited

U.S. PATENT DOCUMENTS

| | | | |
|---|---|---|---|
| 4,305,164 A | 12/1981 | Sargent et al. | |
| 4,493,118 A | 1/1985 | Braxton | |
| 5,093,941 A | 3/1992 | Muller | |
| 6,115,971 A | 9/2000 | Loebertmann et al. | |
| 6,199,222 B1 | 3/2001 | Tagg | |
| 6,370,706 B1 | 4/2002 | Walraven | |
| 6,427,256 B1 | 8/2002 | Mullett et al. | |
| 2003/0121093 A1 | 7/2003 | Braxton | |
| 2003/0208838 A1 | 11/2003 | Mason | |
| 2008/0209624 A1* | 9/2008 | Lavoie | E04H 1/1216 4/449 |
| 2012/0144576 A1 | 6/2012 | Taylor et al. | |
| 2013/0055499 A1* | 3/2013 | Miguel Serda | A47K 3/32 4/476 |
| 2014/0345039 A1* | 11/2014 | Weir | E04H 1/1216 4/476 |

* cited by examiner

*Primary Examiner* — Huyen Le
(74) *Attorney, Agent, or Firm* — Polster Lieder Woodruff & Lucchesi, LC (57) ABSTRACT

A portable toilet is disclosed that has a base and a housing with the base and the housing being configured to be stored and transported to a site as a stack of bases and a stack of housings. The toilet is assembled by telescopically installed one of the housings onto a base where the upwardly extending walls of the base are received within the walls of the housing and where the housing is preferably snap locked to the base. The housing may be disassembled from its base by deflecting one of the housing walls outwardly. A method of storing, transporting and assembling such a portable toilet is also disclosed.

30 Claims, 6 Drawing Sheets

NESTABLE, STACKABLE PORTABLE TOILET AND METHOD OF ASSEMBLING SAME

CROSS REFERENCE TO RELATED APPLICATION

This application claims priority to U.S. Provisional Patent Application No. 61/940,678, filed Feb. 17, 2014, which is herein incorporated by reference in its entirety.

STATEMENT REGARDING FEDERALLY SPONSORED RESEARCH OR DEVELOPMENT

Not Applicable

BACKGROUND OF THE DISCLOSURE

This disclosure relates to portable toilets, and more particularly to nestable, stackable portable toilets that are readily transported in a configuration that allows for a great number of such portable toilets to be transported on a truck or trailer to a site where they toilets are to be used, to be readily assembled for use, to be sturdy during use, and to be readily disassembled to be transported from a site.

Portable toilets are well known. Typically, a portable toilet has a base, a shelter or house, a toilet and usually a urinal within the house, a tank for holding waste, and a door in the house for access and egress from the house. The base and the house are typically constructed of a suitable plastic material so as to be light-weight and to be of economical construction.

Examples of such prior art portable toilets are disclosed in U.S. Pat. Nos. 4,305,164; 4,493,118; 5,093,941; 6,115,971; 6,199,222; 6,427,256; and 6,370,706, and in U.S. Patent Application Publications US 2003/0121093; US 2003/0208838; and US 2012/0144576.

SUMMARY OF THE DISCLOSURE

The present disclosure describes a portable toilet which comprises a base configured to be supported on the ground or other surface where the toilet will be used. The base has a floor and inwardly tapered front, side and back walls secured to or otherwise extending up from the floor and tapering inwardly. A waste tank may be installed within the walls of the base. The portable toilet of this disclosure further includes a shelter or housing having a front wall, a back wall, and side walls extending between the front and back walls, and a roof. The front, side and back walls of the shelter taper inwardly. The front walls of both the base and the shelter have a door opening which may be closed by a suitable door hingedly mounted at least to the shelter. A plurality of bases may be stacked one on top of the other with an upper base being at least partially receiving the upper regions of the front, side and back walls of a lower base. A plurality of shelters or housings may be stacked or nested one within another. This allows for compact storage of the toilets and allows for the ready transport of a larger number of toilets to a site and minimizes the amount of assembly that must be done before the toilets are ready for use.

To assemble a portable toilet of the present disclosure, a base is un-nested or removed from a stack of bases and placed on the ground. A shelter housing is unstacked from a stack of housings and the bottom portions of the walls of the housing are telescopically received on the upper reaches of the walls on the base and the housing is moved downwardly until the lower edges of the walls of the housing are proximate the floor of the base at which point the walls of the housing and the walls of the base are snap locked together. The base has a floor and at least one wall extending up from the floor and tapering inwardly. The housing has at least one wall tapering inwardly. The base wall has an indentation therein and the housing wall has a tab that extends toward the housing wall. The tab is configured to be resiliently forced into the plane of its wall upon the housing being installed on the base and to resiliently snap fit into the indentation when the tab is in register with the indentation so as to snap lock the housing to the base. Of course, those skilled in the art will recognize that the tab could be could be on the base wall and the indentation could be on the housing wall.

In another embodiment of the portable toilet of the present disclosure the housing may be removably secured to the base by readily installable and removable fasteners.

Still further, a portable toilet of the present disclosure comprises a base and a housing, where the base has a floor and legs extending down from the floor and where the base further has a front wall, a back wall and side walls extending between the front and back walls, where the front, back and side walls extend upwardly from the floor and taper inwardly. The housing has a front wall, a back wall and side walls extending between the front and back walls, wherein one of the bases constituting a lower base is adapted to be telescopically stackable with another of the bases constituting an upper base to form a stack of bases such that the upper reaches of the walls of the lower base in the stack are at least in part telescopically received within the next adjacent upper base. One of the housings constituting a lower housing is adapted to be telescopically stackable within another of the housings constituting an upper housing to form a stack of housings such that the walls of the lower housing are telescopically received within the walls of the upper housing the walls of one of the housings, wherein only a portion of the walls of the lower housing extend out beyond the bottom of the walls of the upper housing.

A method of the present disclosure involves storing, transporting and assembling portable toilets. Each of the toilets comprises a base and a housing. The base has a floor, a front wall, a back wall and side walls extending up from the floor, where the base walls taper inwardly. The housing has a front wall, a back wall, and side walls extending between the front and back walls and tapering inwardly such that the lower portion of the housing walls may be telescopically received on the base walls when the housing is installed on the base. A flexible tab carried by a side wall of either the base or the housing and an indentation within the other of the base or the housing with the tab being in register with a respective indentation when the base and the housing are assembled to form a toilet. The method comprises transporting a stack of the bases and a stack of the housings to a site, where the base walls of a lower one of the bases in the stack of bases are configured to be at least partially received within the next adjacent upper base of the stack such that the height of the stack of bases is less than the sum of the heights of the number of bases in the stack. And, where the walls of a lower one of the housings in the stack of housings are configured to be substantially received within the walls of the next adjacent upper housing of the stack such that only a portion of the walls of the lower housing extends out beyond the lower margin of the next adjacent upper housing. The method further comprises removing one of the bases from the stack of bases and placing the one base on a surface, and removing one of the housings from the stack of housings. Then, the one housing is installed onto a respective base such that the tabs snap lock into the indentation of the base walls thereby to secure the housing to the base.

Other objects and features of the portable toilet and methods of this disclosure will be in part apparent to those skilled in the art and will be particularly pointed hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Referring now to the drawings, a portable toilet of the present disclosure is indicated in its entirety by reference character 1 and is shown to comprise a base 3 and a shelter or housing 5 secured to the base. Base 3 includes a floor 7 (see FIG. 5) having four corner legs or supports 9 that extend down to contact the ground or other surface on which the toilet is to be used. The upper surface of the floor 7 constitutes the floor of the toilet. As indicated at 11 in FIG. 6, the base has a front wall 11 attached to and extending up from floor 7. The front wall 11 has a bottom portion of a door opening 13 through which users may enter and exit the toilet. The base 3 further has a pair of spaced side walls 15a, 15b and a rear wall 17 secured to or formed with the base. These walls extend up from floor 7. The side walls extend between the front and rear walls. Walls 11, 15a, 15b and 17, floor 7, and the remainder of base 3 are preferably integrally molded of a suitable thermoplastic material. However, those skilled in the art that the housing of this disclosure need not be a unitary molded structure.

Figures 2, 3:
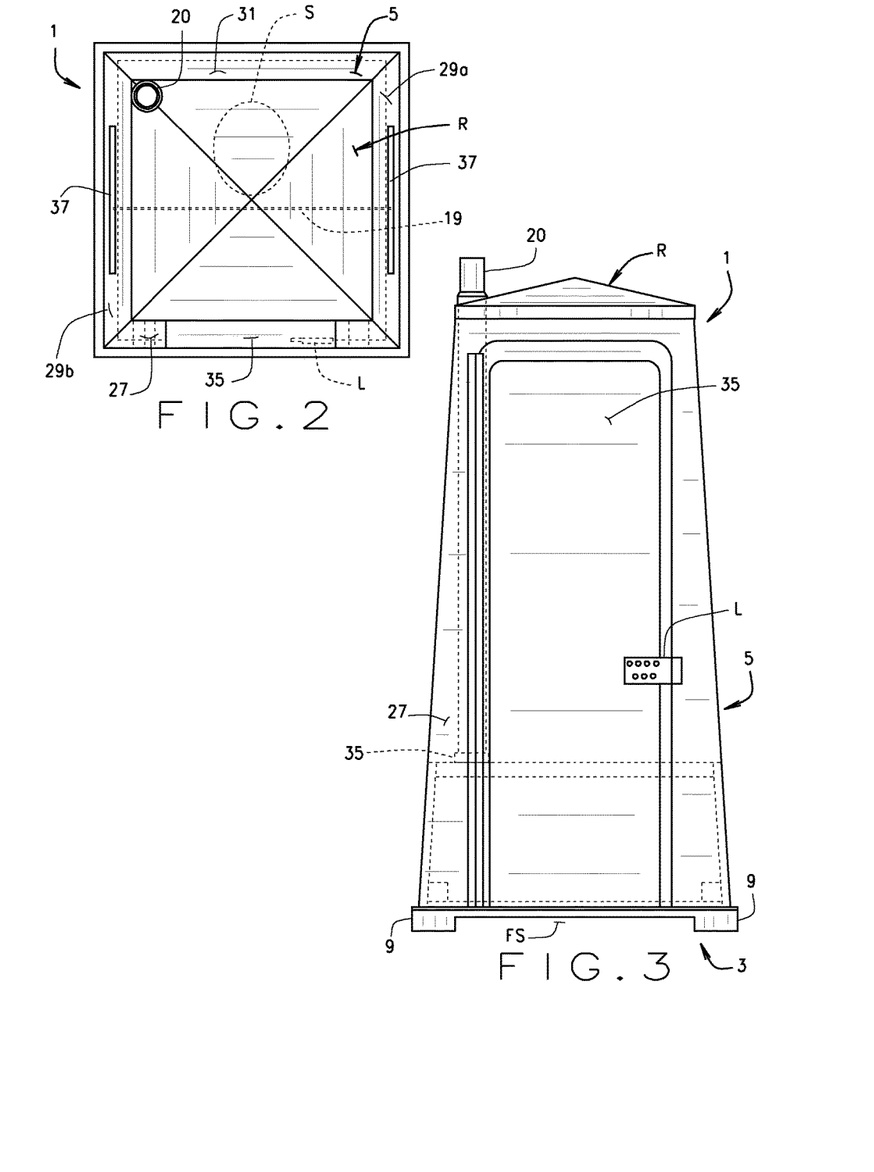
FIG. 2 is a top plan view of the toilet.
FIG. 3 is a front elevational view of the toilet.
Figure 6:
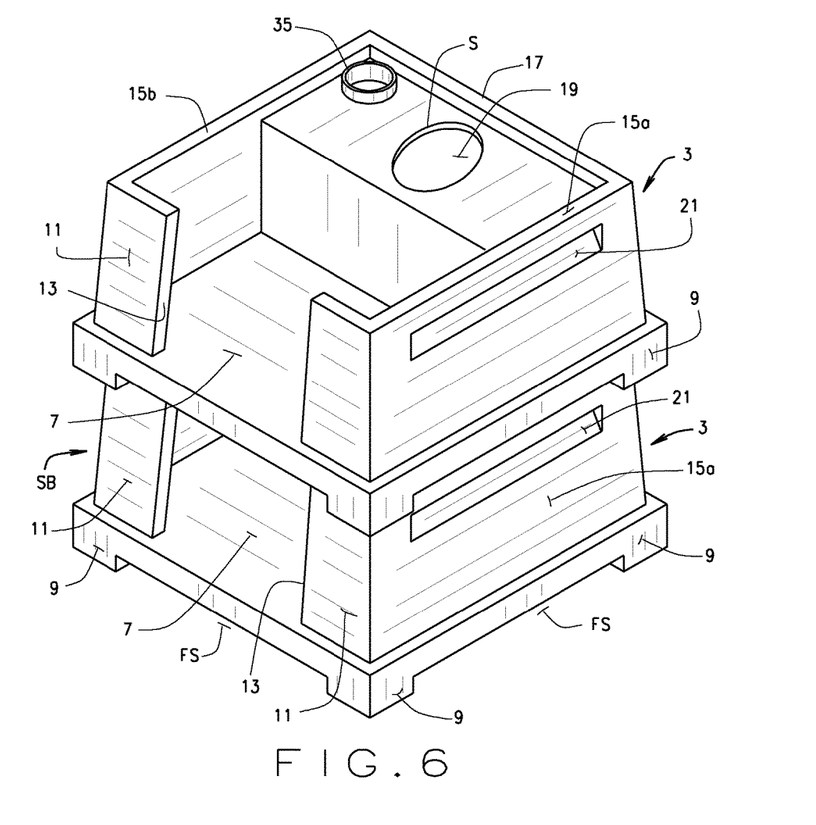
FIG. 6 is a perspective view of a plurality of bases stacked or nested one within the other for the compact storage or transport of the bases.

The walls of base 3 extend up from the floor 7 of the base a suitable distance, for example, about 19 inches (about 48 cm.). A waste tank 19 may be secured within walls of the base. Tank 19 may be rotationally molded of a suitable thermoplastic material. It will be understood that the tank 19 may have a toilet seat S, as shown in FIGS. 2 and 6, and/or a urinal (not shown) may be attached to a side wall of the base and connected to the tank. The front, side and rear walls of base 3 preferably extend up somewhat above the level of the tank a short distance. Tank 19, when toilet 1 is assembled and ready to use, has a vent pipe 20 which extends up from a fitting F in the top of the tank through an opening in the roof R of the toilet so as to vent the tank above the roof of the toilet.

Housing 5 has a front wall 27, spaced side walls 19a, 29b and a rear wall 31 with the side walls extending between the front and rear walls. Preferably, the walls of housing 5 form a one-piece structure but those skilled in the art will recognize that housing walls need not be integrally molded together, but rather may be attached (bonded or mechanically attached) to one another to form the housing 7. Regardless of how the housing is formed, the base, the floor and the walls form a one-piece assembly. The walls of the base and of the housing preferably taper inwardly at an angle, preferably at an angle of about a 5°, plus or minus about 3°, for purposes as will appear. Walls 27, side walls 29a, 29b, and rear wall 31 of housing 5 are preferably constructed of sheet-like thermoplastic material. For example, the housing walls may be thermoformed of sheets of a suitable plastic, such as polyethylene or the like, and may have a thickness sufficient for use as a toilet. Alternatively, the walls of the housing may be relatively flat sheets of thermoplastic material joined along the corners of the housing either by thermoplastic welding or may be mechanically joined by suitable fasteners and the corners of the housing may be reinforced by angles (not shown).

A plurality of bases 3 may be stacked or nested one on the other to form a stack of bases SB. As shown in FIG. 6, when one base 3 is stacked on top of a lower base 3 to form the stack of bases SB, the top portion of the walls 11, 13 and 15a, 15b of a lower base are partially received or nested within the corner legs 9 of the next adjacent upper base 3. This nesting of the bases in stack SB interlocks the bases together thus assuring that the bases in the stack of bases do not move relative to one another during transport and allows for the compact storage and transport of the bases. The total height of the stack of bases SB is less than the sum of the heights of the bases in the stack. As will be appreciated, a stack SB of bases 3 takes up no more floor space than a single base. As shown in FIGS. 1 and 3-5, a space FS is present under base 3 between legs 9 sufficient to receive the forks of a fork lift or the like so that the stack SB of bases may be readily and easily transported and loaded onto or unloaded from a truck or the like. It will be further appreciated that due to the interlocking of the upper portions of the walls of a lower base within the corner legs 9 of the next upper base, the stack need not be wrapped with film or the like to keep the bases in the stack from shifting during transport or the like. It will be further appreciated that this stack of bases requires only a fraction of the floor space or space on a truck or trailer to store or transport the bases, depending on how many bases are in the stack.

Figure 1:
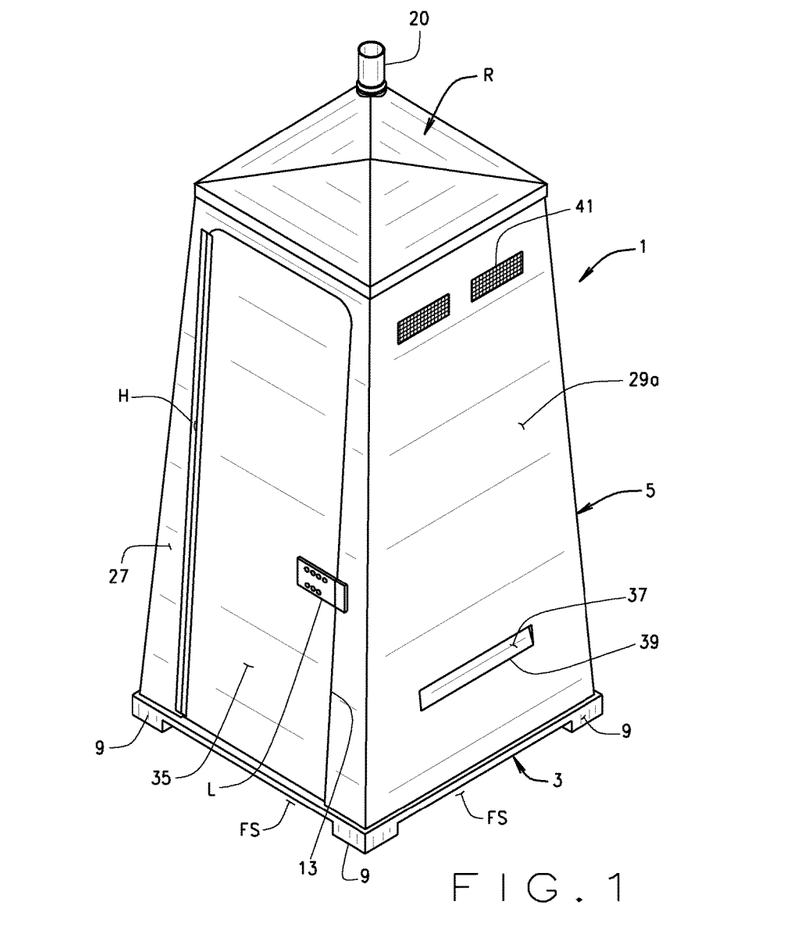
FIG. 1 is a perspective view of a portable toilet of the present disclosure having a base and a shelter or housing removably installed on the base to form the toilet of the present disclosure.
Figure 5:
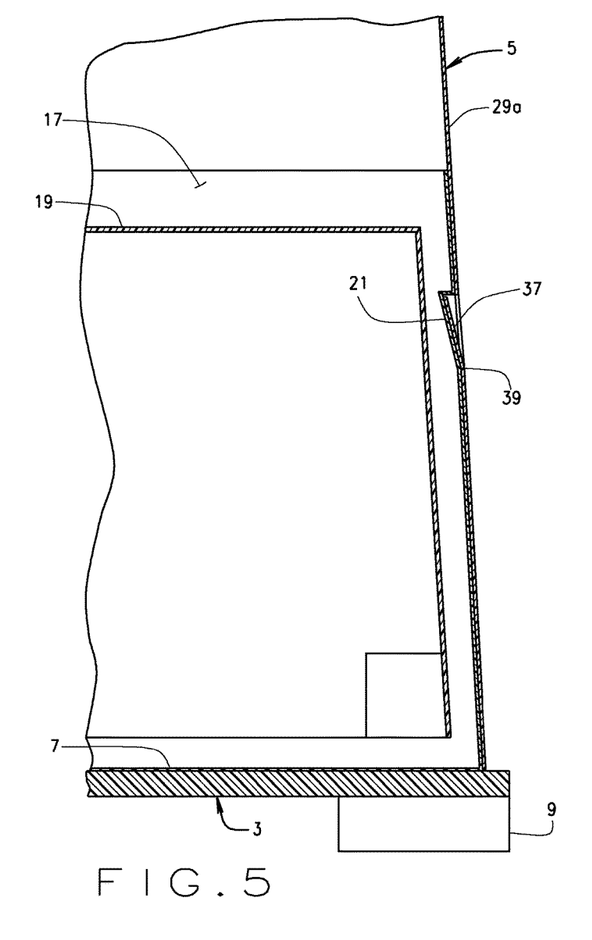
FIG. 5 is a vertical cross sectional view of the toilet taken along line 5-5 of FIG. 4 illustrating on an enlarged scale a snap lock tab carried by the wall of the shelter or housing that cooperates with an indentation in the wall of the base to snap lock the housing to the base.

As shown in FIGS. 5 and 6, at least one female indentation or recess 21 is formed in the outer surface of at least the side walls 15a, 15b of the base 3. Those skilled in the art will appreciate that the indentations could also function in the identical manner (as will be described) by an opening the side walls and thus the terms "indentation" and "recess" as used in this disclosure and the claims include an indentation, recess, depression, or opening. As shown in FIGS. 1 and, there is only one elongated indentation 21 in each side wall 15a, 15b, but more than one such recess may be provided in each wall 6. If desired, a similar indentation can be provided in back wall 17.

As described, shelter or housing 5 preferably comprises a unit having a front wall 27, side walls 29a, 29b, and a rear wall 31 with the side walls extending between the front and rear walls. The front wall 27 of housing 5 has door opening 13 therein that registers with the door opening 13 in the base 3 to provide a door opening for a person using the toilet to enter and exit the toilet. As shown in FIGS. 1 and 3, a door 35 is hingedly mounted to the front wall 27 on one side of the door opening 13 by suitable hinges H and a lock L may be provided so that when a person enters the toilet, the door may be closed and locked. The heights of the shelter 5 and the door opening 13 are sufficient so as to allow a person to easily enter and use the toilet.

Figure 7:
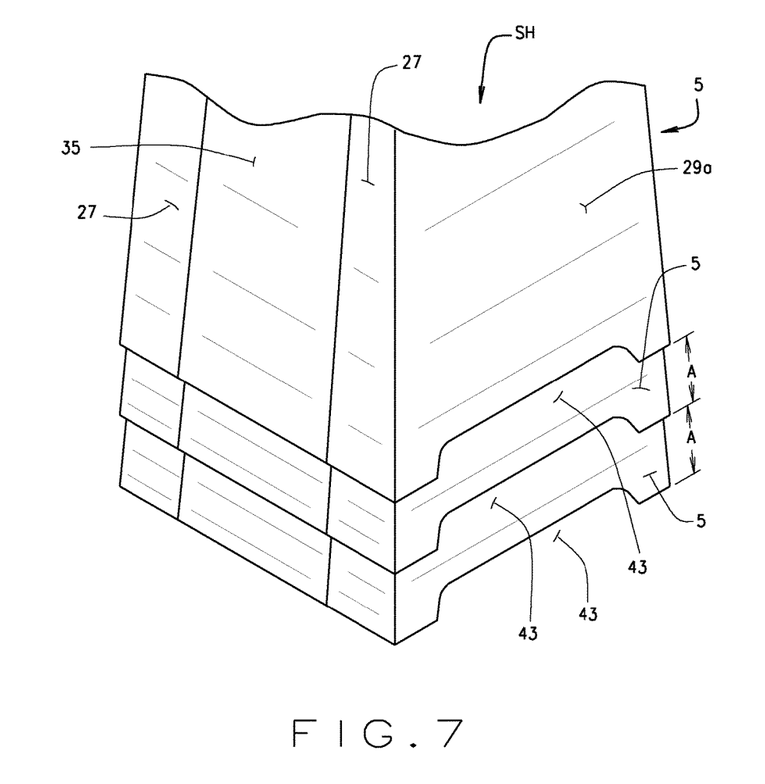
FIG. 7 is a perspective view of a plurality of shelters without their bases stacked or nested one within the other for compact storage or transport of the shelters.

The shelter or housing 5 has a roof R that mates with and is secured to the upper reaches of housing walls 27, 29a and 29b, and 31 to enclose the top of the shelter. It will be appreciated that roof R may be thermoformed of a suitable thermoplastic sheet material and is preferably fastened to the upper reaches of the housing walls. Roof R may remain attached to the housing walls when the housings are stacked one within the other to form a stack SH of housings, as shown in FIG. 7 and as will be further described. Alternatively, the roof R may be removed from housing and stacked one within the other and delivered to a site in a stack of roofs (not shown) and then installed on the upper reaches of the housing walls as the toilet 1 is assembled.

Tank vent tube 20 is sealably mated with a fitting 35 in the top of tank 19 and extends vertically within housing 5 and projects through roof R for venting the tank at a location above the toilet. After installing the housing 5 on base 3, from the inside of the housing, a service person may insert the upper end of the vent tube through its opening in roof R and may sealingly mate the lower end of the tube to fitting 35 on the top of tank 19. Upon disassembly of the toilet, the vent tube may be quickly uncoupled from the tank 19, preferably before the housing is removed from the base. A cap (not shown) may be applied to fitting 35 so as to contain the contents of tank 19.

Figure 4:
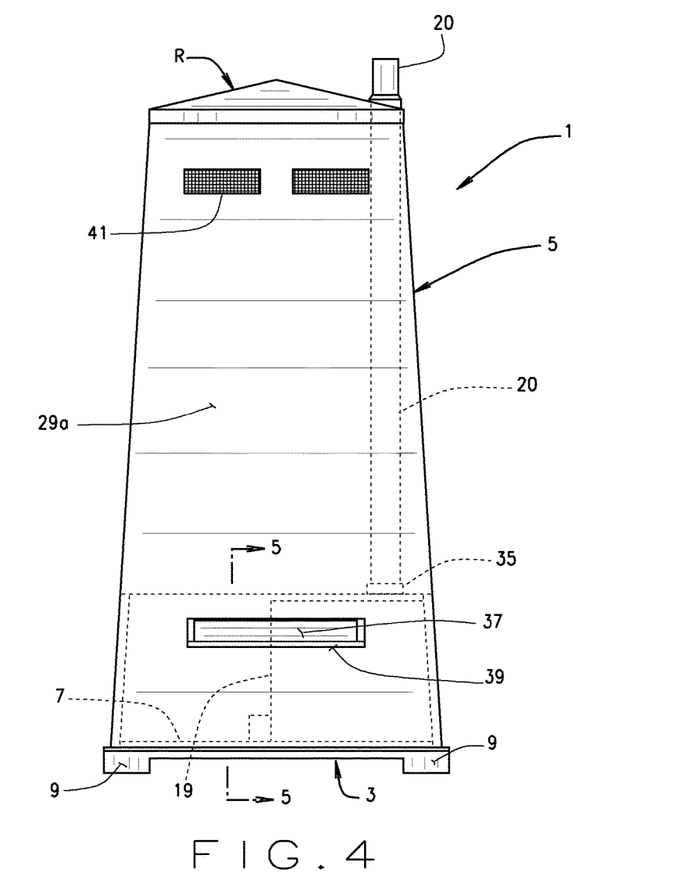
FIG. 4 is a right side elevational view of the toilet.

As indicated at 37 in FIG. 1, the side walls 29a, 29b of housing 3 have so-called male tabs that incline inwardly of the inner surface of its respective housing walls. The sides and the top edge of each tab 37 are preferably free of its respective housing wall but with the bottom of each tab 37, as indicated at 39, integrally attached to its housing wall such that the tab may resiliently flex with respect to its respective wall for purposes as will be described. Each of the tabs 37 is generally in register with a respective female recess 21 in a respective wall of base 3 when housing 5 is telescopically installed on the outside of the walls of its base 3. Because the walls of the base and the walls of the housing are tapered at substantially the same taper angle (e.g., about 5°, plus or minus about 3°), when the housing is telescopically installed on the base, the outer surfaces of the base walls and the inner surfaces of the housing walls are substantially in face-to-face relation with one another (See FIG. 5). As also shown in FIGS. 1 and 4, vent openings 41 may be provided in the upper reaches of side walls 29a, 29b to ventilate the interior of the toilet. Further, one or more structural or decorative recess (not shown) may be formed in the side walls 29a, 28b and in back wall 31 of the housing to stiffen these walls.

As shown in FIG. 7, a plurality of housings or shelters 5 may be telescopically stacked or nested one within another to form housing stack SH such that the upper reaches of the walls 27, 29a and 29b, and 31 and the roof 33 of a lowermost housing 5 are received within the open bottom of an upper housing. In this manner, a plurality of housings may be stored or transported in a compact stack that has a footprint comparable to the footprint of a single housing and thus takes up substantially the same floor space as a single housing. Due to the taper of the walls of the housing, upon stacking the housings 5 to form the housing stack SB, all but a small increment (as shown by dimension A in FIG. 7) of the bottom portions of the walls of a lower housing in the stack are received within the open bottom of the walls of the next upper housing. For example, all but about 12 inches (about 30.5 cm.) of the lowermost region of the lower housing is received within the next adjacent upper housing. This increment A of the bottom portions of the walls of the housing that is not nested within the adjacent upper housing is due to the fact that as the housings are telescopically stacked, the inner surfaces of the walls of the upper housing come to engage the outer surfaces of the walls of the lower housing before the bottom edge of the upper housing is in register with the bottom edge of the lower housing. This arrangement thus prevents the bases of the stack from becoming fully nested one within one another as they are telescopically stacked and makes it relatively easy to unstack the housings.

For example, if four housings 5 are stacked or nested one within the other to form stack SH, the floor space for the stack is substantially the same as the floor space footprint for a single housing. If the housings are stacked three high, the height of the stack is only about 36 inches (91 cm) more that the height of a single housing. Preferably, about 3-6 housings 5 may be stacked in stack SH. The lower reaches of the walls of the housings have sufficient structural strength to support the stack without deformation or damage. It will be appreciated that a forklift tine opening 43 (as shown in FIG. 7) may be provided in the lower margin of the sidewalls 29a, 29b of each housing such that a forklift may readily lift and transport a single housing 5 or a stack SH of housings thus facilitating the rapid loading and unloading of the stack onto or from a truck or trailer. Of course, because multiple housings may be stacked in housing stack SH, the floor space required to support the housings is reduced. Because the footprint of the lower reaches of the housing 5 is similar to the footprint of the base 3, a stack SB of 6 bases and a stack SH of 6 housings requires only about ⅓ the floor space of six fully assembled toilets.

As mentioned above, stacks of nested bases 3 and housings 5 may be loaded on a truck or trailer and transported to a site where the toilets 1 are to be used. At the site, a stack SB of bases 3 and a stack SH of housings 5 may be unloaded from the truck by a forklift or the like, or the stacks of bases and housings may be manually unstacked while on the truck. A base 3 is unstacked from the stack of bases SB and is placed on the ground. A housing 5 is then removed from the stack of housings and is lowered vertically onto its respective base 3 such that the walls of the base are telescopically received on the inside of the lower reaches of the walls of the housing or shelter 5. The inwardly extending male tabs 37 will be slightly bent or flexed relative from their normal positions toward the plane of the inner surface of its respective housing walls as the tabs engage the walls of base 3 and as the housing is telescopically installed on the walls of the base, which, as shown in FIG. 5, are inside of the housing walls. It will be appreciated that each of the male tabs 37 extends inwardly from the inner surface of its respective housing wall such that the housing being installed on the base causes a camming action that resiliently flexes or bends the tab toward the plane of its respective housing wall. As the lower reaches of the walls of the housing move into proximity with the upper surface of floor 7 of the base, the taper of the housing preferably substantially matches the taper of the walls of the base. When the tabs 37 are substantially in register with their respective female recesses 21 in the base walls, the tabs will resiliently spring inwardly relative to cooperate with the female indentation 21 in its corresponding base wall so as to securely snap-lock the housing to the base.

Alternatively, the housing 5 may be installed on its respective base 3 by tipping the housing relative to the base 3 such that the lower edge of one of the side walls 29a, 29b of the housing bears on the outer portion of a side of floor 7 of the base just outside of its the corresponding base sidewall 15a, 15b. Then, the housing may be tipped or rotated to an upright position. Due to the taper of the walls of the base and the taper of the walls of the housing, sufficient clearance is provided to allow the housing to be tipped to an upright position. When the housing is in its upright position, the male tabs 37 on housing side walls 29a, 29b are received in their respective indentations 21 in the base sidewalls 15a, 15b thus snap locking the housing to the base.

While female recesses 21 were described as being formed in the walls of the base and male tabs 35 were described as being formed in the walls of the housing, those skilled in the art will recognize that the tabs could be formed in the base walls and the indentations could be formed in the housing walls.

To disassemble the toilet, the vent tube 20 is preferably removed from tank 19 and is withdrawn from the roof R. As previously described, the opening to tank 19 may closed by a cap (not shown) applied to fitting 35. Thus, the tank may remain in the base. A person on the inside of the housing may push outwardly on a sidewall 29a or 29b of the housing 5 just above the top edge of the adjacent base wall 15a or 15b. Because the walls of the housing are preferably made of sheet-like thermoplastic material, the housing wall can be sufficiently deflected away from the adjacent side wall of the base such that the tab 37 carried by the housing wall will move out of engagement with its respective female recess 21 in a base wall 15a or 15b thereby unlocking that side wall of the housing from the base. Then, the housing may be tilted or rotated toward the opposite side wall thus allowing the housing to be removed from the base in this tilted condition.

Those skilled in the art will appreciate that one person may readily assemble and disassemble the toilet of the present disclosure in a rapid manner without the use of even simple hand tools. This feature, along with the stackable features of the instant toilet allow a large quantity to toilets 1 to be delivered to a site, to be rapidly assembled and positioned for an event, and then to be rapidly disassembled and transported from the site using the minimum number of trucks and personnel. It will be recognized that by using such indentations and tabs to snap lock the housing to the base, it is not possible for a person on the outside of the toilet to remove the housing from the base. This will prevent vandals from removing the housing from the base if the door is locked or if there is a person using the toilet.

Further, if a person inside the toilet cannot readily deflect the housing wall outwardly a sufficient amount by applying an outward force on the inside surface of the housing sidewalls so as to disengage the tab 37 from its indentation 21, that person may insert one or more inclined or tapered blocks or wedges (not shown) between the upper edge of the base sidewall and the housing side wall. By tapping on the upper edges of the wedges, the wedges are forced between the sidewalls of the base and the housing and the housing wall is thus deflected outwardly a sufficient amount such that the tab 37 will disengage from its respective indentation 21. Once the housing sidewall has been sufficiently deflected to disengage the tab from its indentation, the wedges may remain in place thus allowing the person inside of the toilet to exit and to then tip or rotate the housing toward the opposite side of the base and to this remove the housing from the base. In this manner, the toilet 1 may be disassembled by one person.

Also, other snap lock arrangements can be used in place of the preferred tabs 37 and indentations 21. For example, the bottom edges of housing walls 29a, 29b may be provided with nubs that project from the surface of the housing walls. The bottom edges of the housing walls may be received in grooves in the base floor just outside of the base walls and these grooves may be provided with flexible flanges that are deflected by the nubs as the housing is installed on the base such that the flanges capture and hold the nubs thus snap locking the housing to the base. To disassemble the housing from the base, the lower region of one of the housing walls 29a or 29b may be deflected somewhat inwardly thus allowing the nubs on the bottom of the housing wall to disengage from the groove. The housing can then be tipped toward the opposite side of the base thus enabling the housing to be removed from the base.

While the housing 5 is preferably joined to its base 3 through the use of the indentations 23 and the tabs 35, as described above, those skilled in the art will recognize that in place of such snap lock indentations and tabs, the housing may be removably secured to the base using quick connect and disconnect fasteners. An example of such a quick connect/disconnect fastener may be a ball lock pin or detent pin. Such pins are commercially available from the Carr Lane Manufacturing Co. of St. Louis, Mo.

While the walls of the base 3 and housing 5 were shown to be planar walls, those skilled in the art will recognize that, in accordance with this disclosure, the walls can be curved or of other shapes other than planar.

It will be appreciated that other features of the portable toilet disclosed herein will be readily apparent to those of ordinary skill in the art. Further, the term "entity" as used in the method claims of this disclosure refers to a person or company who owns, services, rents, or sells portable toilets to the public or to an organization having an event or other need for such portable toilets.

As various changes could be made in the above constructions and methods without departing from the scope of the disclosure, it is intended that all matter contained in the above description or shown in the accompanying drawings shall be interpreted as illustrative and not in a limiting sense.

The invention claimed is:

1. A portable toilet comprising a base and a housing where the housing configured to be removably secured to the base to form a toilet ready for use, said base having a floor and at least one wall extending up from said floor, said housing having at least one wall such that when said housing is installed on said base said walls of said base and said wall of said housing are configured to at least in part overlap, said base being configured to be stacked one on the other to form a stack of said bases where a portion of a lower base in the stack is partially received within the next higher base in said stack, said housing being configured to be stacked one on the other to form a stack of said housings with a portion of said wall of a lower housing in said stack extending beyond the lower margin of the wall of the housing immediately above said lower housing of said stack of housings, and means for releasably securing said housing wall of one of said housing to said base wall of one of said bases so as to form said portable toilet.

2. A portable toilet as set forth in claim 1 wherein said one base wall is a front wall and wherein said base further has a back wall and side walls extending between said front and back walls, said base walls angling inwardly relative to the base forming a taper angle.

3. A portable toilet as set forth in claim 2 wherein said one housing wall is a front wall, wherein said housing further has a back wall and side walls extending between said front and back walls, said housing walls angling inwardly from bottom to top at substantially the same taper angle as said base walls such that when the housing is installed on said base said housing walls are disposed on the outside of said base walls and said housing walls are in a substantially telescopic relation with said base walls.

4. A portable toilet as set forth in claim 3 wherein said releasable securement means comprises at least one removable fastener joining each wall of said housing to a respective wall of said base.

5. A portable toilet as set forth in claim 4 wherein said removable fastener is configured to be installable and removable from the outside of said housing.

6. A portable toilet as set forth in claim 1 wherein said releasable securing means comprises a resilient tab carried by one of said walls and a corresponding indentation in the other of said walls such that as said housing is installed on said base said tab is received in its respective said indentation such that said base and said housing are snap locked together.

7. A portable toilet as set forth in claim 6 wherein said tab is configured to be resiliently forced toward the plane of its respective wall upon said housing being installed on said base, and wherein said indentation in the other of said wall is configured to receive said tab when said indentation is in register with said tab such that said tab and said indentation snap lock said housing to said base.

8. A portable toilet comprising a base and a housing that snap locks with said base, said base having a floor and at least one wall extending up from said floor and tapering inwardly, said housing having at least one wall tapering inwardly, said walls of said base and of said housing being configured to at least partially overlap with one another when said housing is installed on said base, a tab carried by one of said walls and extending out of the plane of its respective wall toward said other wall, said tab being configured to be forced at least in part into the plane of its respective wall upon said housing being installed on said base, an indentation in the other wall configured to receive said tab when said indentation is in register with said tab such that said tab and said indentation snap lock said housing to said base.

9. A portable toilet as set forth in claim 8 wherein said base has a back wall and side walls extending between said front and back walls of said base such that said one wall of said base is one of said side walls, and wherein said housing has a back wall and side walls extending between said front and back walls of said housing such that said one wall of said housing is one of said side walls, said side walls of said base and of said housing each having at least one of said tabs or at least one of said indentations such that when said housing is installed on said base said tabs are received in respective indentations so as to snap lock said housing to said base.

10. A portable toilet as set forth in claim 9 wherein said front, side and back walls of said base and of said housing at least in part telescopically overlap when said housing is snap locked to said base.

11. A portable toilet as set forth in claim 9 wherein said front, side and back walls of said housing are telescopically received on the outside of said front, side and back walls of said base.

12. A portable toilet as set forth in claim 11 wherein said walls of said base and said walls of said housing are inwardly tapered such that when said housing is telescopically received on said base the walls of said housing and of said base at least in part overlap substantially in face-to-face engagement.

13. A portable toilet as set forth in claim 9 wherein said housing further comprises a roof covering the top of said housing.

14. A portable toilet as set forth in claim 13 wherein said roof may be installed on and removed from said housing walls.

15. A portable toilet as set forth in claim 9 wherein said front walls of said base and of said housing have a door opening therein, and wherein said toilet further comprises a door adapted to be secured to said housing to enable said door opening to be opened and closed.

16. A portable toilet as set forth in claim 9 wherein said tab is configured to be resiliently deflected toward the plane of its respective wall upon said housing being telescopically installed on said base, and wherein said tab is further configured to resiliently spring into engagement with its respective indentation when the tab is in register with its respective indentation thereby to snap lock the housing and the base together.

17. A portable toilet comprising a base and a housing, said base having a floor, a front wall, a back wall, and side walls extending between said front and back walls with said walls extending upwardly from said floor and tapering inwardly, said housing having a front wall, a back wall and side walls extending between said front and back walls with a roof covering the upper portions of said housing, wherein each of said sidewalls of said base has a female indentation therein and each of said housing side walls has a corresponding male tab adapted to be in register with a respective said female indentation such that when said housing is installed on said base walls said tab snap locks into said female indentation thereby to secure the housing to the base.

18. A portable toilet as set forth in claim 17 wherein each of said tabs extend inwardly from the inner surface of its respective housing wall.

19. A portable toilet as set forth in claim 17 wherein the lower portions of said housing walls are adapted to telescopically receive said base walls, and wherein each of said tabs is adapted to be resiliently forced toward the plane of its respective housing wall as said housing is telescopically installed on said base and to be received in its respective indentation when said tab is in register with its respective indentation.

20. A portable toilet as set forth in claim 17 wherein said base walls and said housing walls taper inwardly at a similar taper angle, and wherein said housing walls are configured to telescopically receive the walls of said base within said housing walls as said housing is lowered onto said base, each of said tabs being configured to be at least in part compressed into the plane of their respective housing walls until said tabs are in register with their respective indentations in said base walls at which point each said tab is configured to spring into its respective indentation thereby secure said housing to said base.

21. A portable toilet comprising a base and a housing, said base having a floor and legs extending down from said floor and having a front wall, a back wall and side walls extending between said front and back walls, said front, back and side walls extending upwardly from said floor and tapering inwardly, said housing having a front wall, a back wall and side walls extending between said front and back walls and tapering inwardly, a stack of said bases with one of said bases of said stack of bases constituting a lower base being configured to be at least partially received within with a next adjacent upper base of said stack of bases, a stack of said housings with one of said housings of said stack of housing constituting a lower housing being configured to be at least partially received within a next adjacent upper housing of said stack of said housings such that the walls of said lower housing are substantially received within the walls of said upper housing and such that only a portion of the walls of the lower housing extend out beyond the bottom margin of the walls of the upper housing.

22. A method of storing, transporting and assembling portable toilets, each of said toilets comprising a base and a housing, said base having a floor and at least one base wall extending up from said floor, said base wall tapering inwardly as it extends up from said floor, said housing having at least one wall tapering inwardly such that the lower portion of said housing wall is configured to receive said base wall, said toilet having means for securing said housing to said base when said housing wall receives said base wall, said method comprising instructing an entity purchasing the portable toilet to perform the following steps:
 a. transporting a stack of said bases and a stack of said housings to a site, where the base wall of a lower one of said bases in said stack of bases is configured to be at least partially received within the next adjacent upper base of said stack such that the height of said stack of bases is less than the sum of the heights of the number of bases in said stack, and where the wall of a lower one of said housings in said stack of housings is configured to be substantially received within the walls of the next adjacent upper housing of said stack such that only a portion of the wall of the lower housing extends out beyond the lower margin of the next adjacent upper housing;
 b. removing one of said bases from said stack of bases and placing said one base on a surface;
 c. removing one of said housings from said stack of housings;
 d. telescopically fitting the lower portions of said housing onto said base such that said housing is secured to said base.

23. The method of claim 22 wherein said step of securing said one base to said one housing further comprises instructing said entity to install a removable fastener to join the housing to the base.

24. The method of claim 23 wherein the wall of either the housing or the base has a tab and wherein the other of the housing or the base has an indentation positioned to be in register with said tab when said housing is telescopically received on said base such that said tab is received in its respective base thereby to join the housing to the base.

25. A method of storing, transporting and assembling portable toilets, each of said toilets comprising a base and a housing, said base having a floor and at least one base wall extending up from said floor, said base wall tapering inwardly as it extends up from the floor of the base, said housing having at least one wall tapering inwardly such that the lower portion of said housing wall is configured to receive said base wall when said housing is installed on said base, said toilet having means for securing said housing to said base when said housing is installed on said base, said method comprising the following steps:
 a. transporting a stack of said bases and a stack of said housings to a site, where the base wall of a lower one of said bases in said stack of bases is configured to be at least partially received within the next adjacent upper base of said stack such that the height of said stack of bases is less than the sum of the heights of the number of bases in said stack, and where the wall of a lower one of said housings in said stack of housings is configured to be substantially received within the wall of the next adjacent upper housing of said stack such that only a portion of the wall of the lower housing extends out beyond the lower margin of the wall of the next adjacent upper housing;
 b. removing one of said bases from said stack of bases and placing said one base on a surface;
 c. removing one of said housings from said stack of housings;
 d. telescopically fitting the lower portions of said housing wall of said one housing onto the base wall of said one base; and
 e. securing said housing to said base.

26. A method of storing, transporting and assembling portable toilets, each of said toilets comprising a base and a housing, said base having a floor and at least one base wall extending up from said floor, said base wall tapering inwardly as it extends up from the floor, said housing having at least one wall tapering inwardly such that the lower portion of said housing wall is configured to receive said base wall, one of said walls having at least one female indentation therein and the other of said walls having a tab configured to be resiliently received in said indentation when said housing wall receives said base wall, said method comprising the following steps:
 a. transporting a stack of said bases and a stack of said housings to a site, where the base wall of a lower one of said bases in said stack of bases is configured to be at least partially received within the next adjacent upper base of said stack such that the height of said stack of bases is less than the sum of the heights of the number of bases in said stack, and where the wall of a lower one of said housings in said stack of housings is configured to be substantially received within the walls of the next adjacent upper housing of said stack such that only a portion of the wall of the lower housing extends out beyond the lower margin of the next adjacent upper housing;
 b. removing one of said bases from said stack of bases and placing said one base on a surface;
 c. removing one of said housings from said stack of housings; and
 d. telescopically fitting the lower portions of said housing walls of said one housing onto the base walls of said one base such that said tabs snap lock into said indentations thereby to join said housing to said base.

27. The method of claim 26 where said tab is flexible, and wherein the method further comprises resiliently deflecting said tab toward the plane of its respective wall as said housing is fitted onto said base thereby enable said tab to snap lock said housing to said base upon said tab being in register with said indentation.

28. The method of claim 26 further disassembling said housing from said base by deflecting at least one wall of said housing outwardly thereby to disengage at least one of said tabs from its respective indentation so as unlock said at least one wall of the housing from the base.

29. The method of claim 28 wherein with said one wall unlocked from the base, said method further comprises rotating said housing relative to said base to remove said housing from said base.

30. A method of storing, transporting and assembling portable toilets, each of said toilets comprising a base and a housing, said base having a floor, a front wall, a back wall and side walls extending up from said floor, said base walls tapering inwardly relative to said floor, each of said base side walls having at least one female indentation therein, said housing having a front wall, a back wall, and side walls extending between said front and back walls and tapering inwardly such that the lower portion of said housing walls may be telescopically received on the outside of said base walls, said side walls of said base or of said housing having a flexible tab configured to extend toward an adjacent side wall of said housing or of said base, and the other adjacent side wall of said base or of said housing having a respective said female indentation therein configured to receive a respective tab when said base and said housing are assembled to form a toilet, said method comprising instructing an entity purchasing the portable toilet to perform the following steps:
  a. transport a stack of said bases and a stack of said housings to a site, where the base walls of a lower one of said bases in said stack of bases are configured to be at least partially received within the next adjacent upper base of said stack such that the height of said stack of bases is less than the sum of the heights of the number of bases in said stack, and where the walls of a lower one of said housings in said stack of housings are configured to be substantially received within the walls of the next adjacent upper housing of said stack such that only a portion of the walls of the lower housing extends out beyond the lower margin of the next adjacent upper housing;
  b. remove one of said bases from said stack of bases and placing said one base on a surface;
  c. remove one of said housings from said stack of housings; and
  d. telescopically fit the lower portions of said housing walls of said one housing onto the base walls of said one base such that said tabs snap lock into said indentations thereby to join said housing to said base.

\* \* \* \* \*